Oct. 16, 1956   W. H. RANDALL   2,766,919
SERVING HOLDER
Filed Jan. 29, 1953   10 Sheets—Sheet 1

INVENTOR.
WALTER H. RANDALL

Oct. 16, 1956   W. H. RANDALL   2,766,919
SERVING HOLDER
Filed Jan. 29, 1953   10 Sheets-Sheet 2
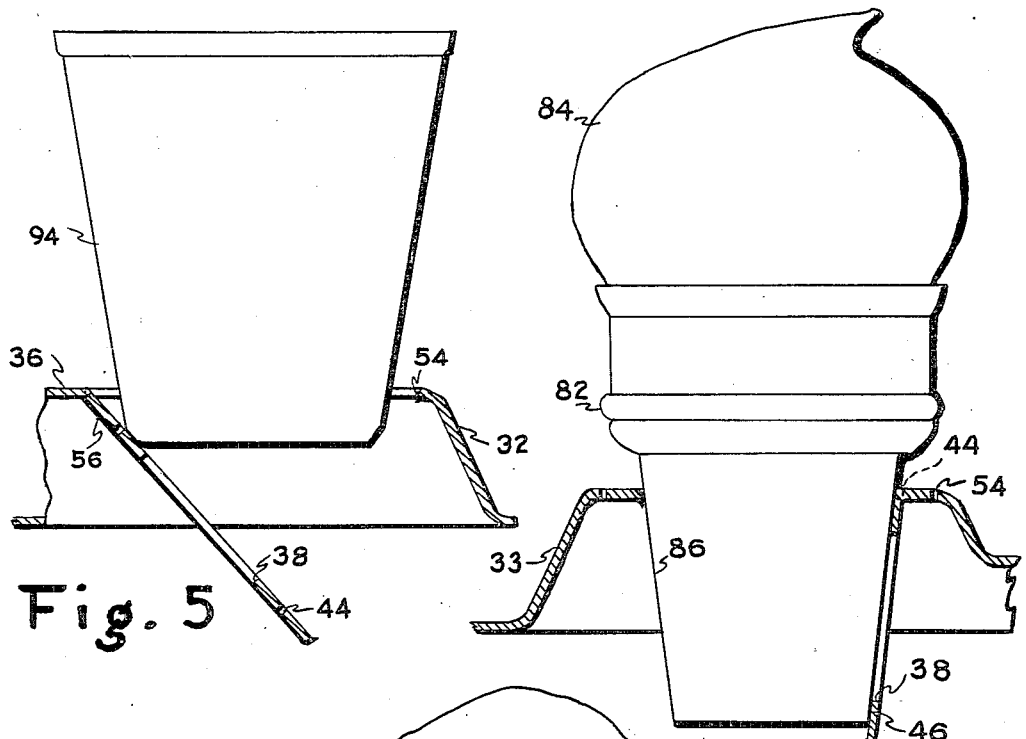
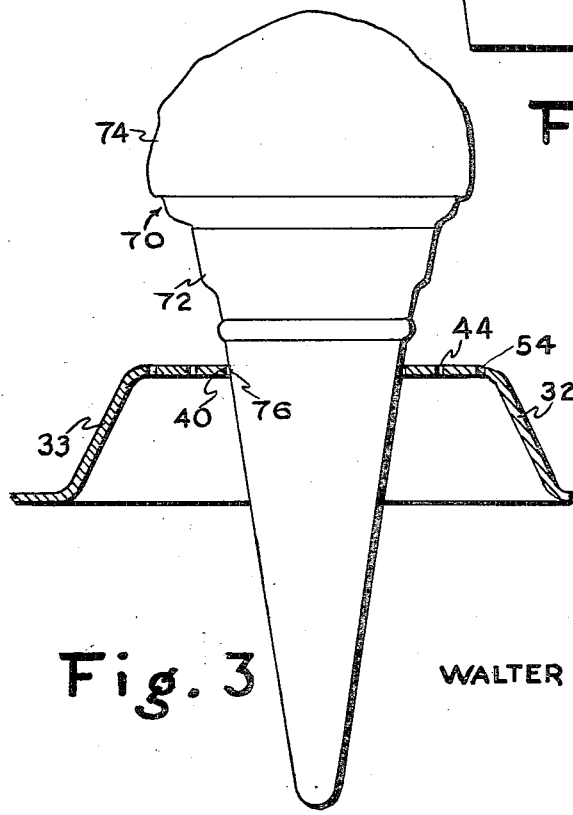
INVENTOR.
WALTER H. RANDALL

INVENTOR.
WALTER H. RANDALL

Oct. 16, 1956 W. H. RANDALL 2,766,919
SERVING HOLDER
Filed Jan. 29, 1953 10 Sheets-Sheet 4

INVENTOR.
WALTER H. RANDALL

Oct. 16, 1956  W. H. RANDALL  2,766,919
SERVING HOLDER

Filed Jan. 29, 1953  10 Sheets-Sheet 5

INVENTOR.
WALTER H. RANDALL
BY *Connolly and Hutz*

HIS ATTORNEYS

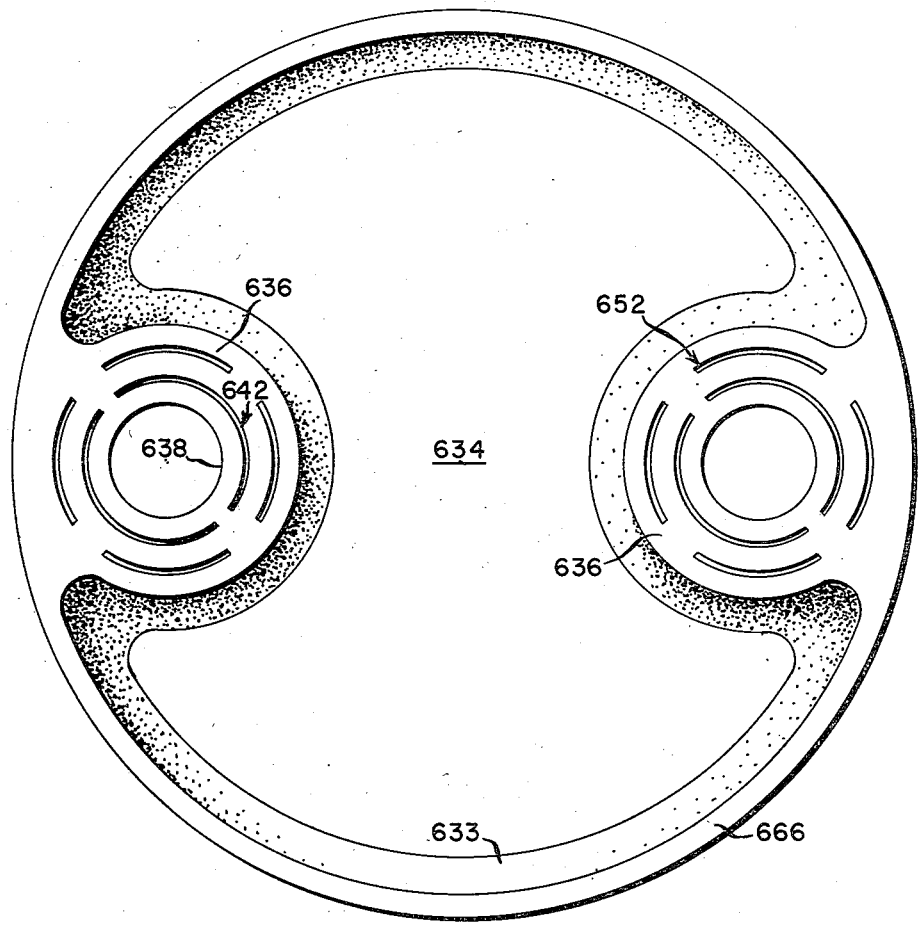

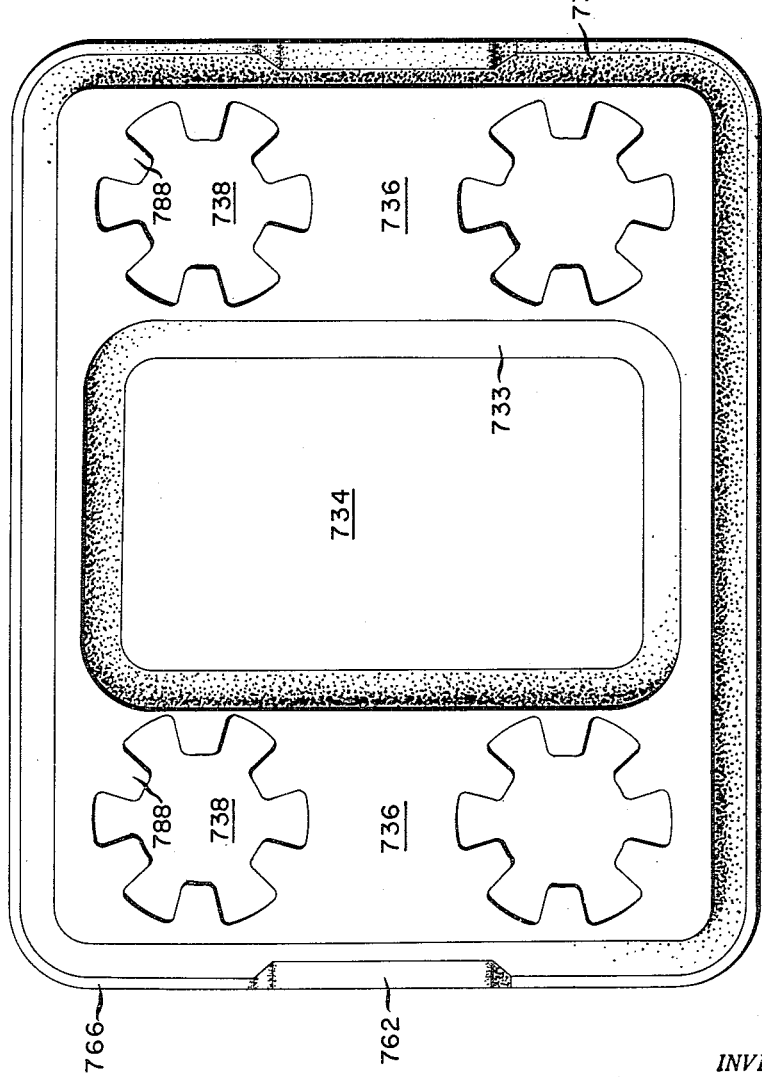

Oct. 16, 1956 W. H. RANDALL 2,766,919
SERVING HOLDER
Filed Jan. 29, 1953 10 Sheets-Sheet 8

INVENTOR.
WALTER H. RANDALL

Oct. 16, 1956  W. H. RANDALL  2,766,919
SERVING HOLDER

Filed Jan. 29, 1953  10 Sheets-Sheet 10

*INVENTOR.*
WALTER. H. RANDALL

United States Patent Office 2,766,919
Patented Oct. 16, 1956

2,766,919

SERVING HOLDER

Walter H. Randall, Waterville, Maine, assignor to Keyes Fibre Company, Portland, Maine, a corporation of Maine Application January 29, 1953, Serial No. 334,031

4 Claims. (Cl. 229—2.5)

This invention relates to article carriers or tray-like holders for serving edible articles such as sandwiches, ice cream, drinks or the like.

Among the objects of the present invention is the provision of a novel, inexpensive serving holder for convenient use in securely carrying items of many different sizes.

One of the main purposes of the instant invention is the provision of an article supporting tray made from cellulosic material which is light, inexpensive, and functionally versatile while at the same time possessing the necessary sturdiness and rigidity for retaining and supporting food and drink containers of conventional designs, and constitutes an improvement over the prior art type of cellulosic carriers or trays, such as those disclosed in prior U. S. Letters Patent 2,466,636 and 2,556,844 which require bulky box-like tray structures.

A primary object of the invention is to provide a simply constructed article supporting tray or carrier which may be nested in other like articles during transportation and storage in such manner that the nested array occupies slightly more space than is necessary to accommodate the arithmetic total of the individual tray wall thicknesses. A further object is to obtain such type nesting arrangement with carrier constructional features which are preassembled or built into the carrier so that the same is immediately ready for use without any additional assembly or preparatory operation upon being removed from its stored condition. A still further object is the provision of a tray or carrier construction of such contour that a stack assembly or array of the same constitutes an interlocked mass which cannot be easily blown over or disarranged.

The above as well as additional objects of the present invention will be more completely understood from the following description of several of its exemplifications, reference being made to the accompanying drawings wherein:

Fig. 3 is a fragmentary sectional view of the construction of Fig. 1 taken along line 3—3 with a different article shown held in place;

Figs. 4 and 5 are views similar to Fig. 3 showing steps in the securing of the differently dimensioned items in the serving tray;

Fig. 13 is a plan view of a still further embodiment of the invention;

Fig. 14 is a plan view and Fig. 15 is a side view of another embodiment of the present invention;

According to one form of the present invention the article carrier has a tray-like wall of cellulosic material with at least one perforation-defining formation dimensioned to receive an article of a predetermined width, a first line of weakness defining a first tear-out panel about said formation and dimensioned to make way for an article having a width larger than said predetermined width, and a second line of weakness defining a larger tear-out panel about said formation to make way for an article having a still larger width, said lines of weakness weakening the tray-like wall sufficiently so that articles of said larger and still larger widths automatically tear the respective panels out of the wall as these articles are pushed against the perforation-defining portion.

According to another form of the present invention the article carrier, having a tray-like wall of cellulosic material, is provided with at least one perforation-defining formation having a plurality of radially directed spaced wall tongues or grip fingers. In this form of the invention the inner ends of the tongues define a first article-receiving hole or cavity of a predetermined width, the finger-grip members being yieldable so that they will be bent or flexed out of the plane of the tray wall adjacent to the perforation-defining formation by larger articles to provide various predetermined widths in the opening to support these articles.

In a preferred form of the invention the above finger-grip article-supporting elements are in turn provided with transverse lines of weakness so that they function as unique type article-gripping members.

Reference will now be made to a specific embodiment of the initially described form of the invention as set forth previously and in which for best adaptation to receive the articles of different widths, it is preferred that the wall be weaker at the first line of weakness than at the second line of weakness to help assure that only the first panel is pushed out when an article of that width is pushed against the perforation-defining wall. The lines of weakness can be made as interrupted slots or as portions of reduced wall thickness; or if desired, as lines defined by closely spaced perforations for the line of greatest weakness and more widely spaced perforations for the line of least weakness.

Figure 1:
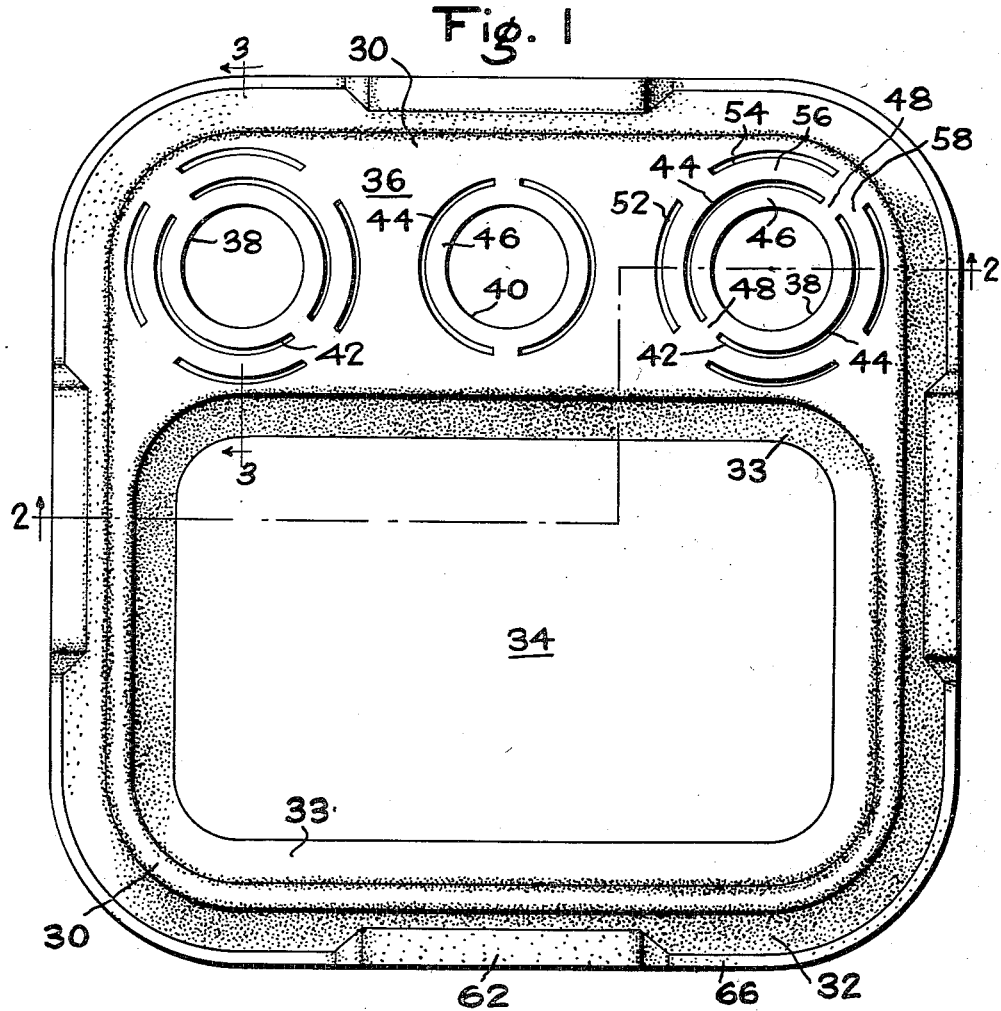
Fig. 1 is a plan view of a serving tray according to the present invention.
Figure 2:
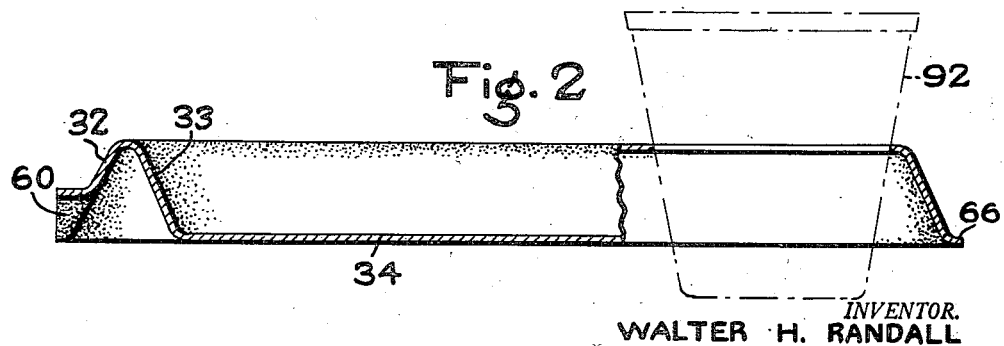
Fig. 2 is a sectional view taken along the line 2—2 of the construction of Fig. 1, with a cup shown held in place.

Referring now to the drawings, Figs. 1 and 2 show one highly practical form of serving holder made of molded pulp. As shown, the holder is generally square in plan view with rounded corners, and has a relatively flat body portion 30 surrounded by an angularly-disposed depending marginal wall flange 32. Wall 32 extends around the entire periphery of the holder and is shaped to give it an inverted tray-like configuration.

Within the body portion 30 is formed a depressed cavity or tray section 34 bounded by angularly disposed depending wall flanges 33. The section 34 does not take up all the available space on the body and leaves a raised plateau-like surface or support wall 36. Wall 36 is punctured by a plurality of apertures or holes 38, 40 provided to receive and support the articles to be held and carried. The apertures, although shown of uniform size and shape, may obviously be varied in these respects to suit the particular needs.

Around apertures 38, 40 there is also provided a line of weakness 42 shown in the figure as a pair of spaced slots 44 that extend almost completely around the aperture 38 to define a tear-out panel 46. The line of weakness 42 is, however, strong enough to retain panel 46 in place in the absence of a positive force applied to the panel. For this purpose where slots are used, they should be separated as by webs 48.

About the lines of weakness 42 surrounding apertures 38 a second line of weakness 52 is also provided so as to provide a second larger tear-out panel 56. In the construction of Fig. 1 this second line is also in the form of slots 54 spaced apart by webs 58. The aperture 40 is shown as only surrounded by a single line of weakness, but this line can be entirely omitted or, if desired, surrounded by a second line of weakness.

As shown more clearly in Fig. 2, marginal wall 32 includes a plurality of notches 60 that extend only part way up the height of the wall, but are wide enough to receive the fingers of the hand. The margins of the notches 60 are flanged as indicated at 62 to provide a finger-grip archway in the side wall. These flanges are run together with a peripheral flange 66 which extends completely around the wall 32 to provide an increased tear-resisting strength to the finger-grip.

A feature of the present invention is that the inner lines of weakness 42 weaken the wall 36 more than the coaxial outer lines of weakness 52. In this way it becomes a very simple matter for articles having a width too large to fit in apertures 38, to be pushed down against tear-out panel 46 and readily tear this panel out without disturbing the connecting webs 58 of the larger tear-out panel. On the other hand, if articles of still larger width are to be held on the carrier, such articles may be pushed down against the larger panel 56 and readily tear it out with the same or slightly greater pressure. In other words, the holder of the present invention will accommodate and conveniently hold articles of three different sizes corresponding to the dimensions of aperture 38, inner line of weakness 42 and outer line of weakness 52 without special adjustment operations or increased force.

One of the unexpected advantages of the instant tray construction is the fact that the connecting webs 48 and 58 are sufficiently strong to resist tearing when an article is suspended by the lip of the attached panel section and yet are capable of easy and ready separation when an article is forced against the web proper with only a minimum of extra pressure.

By way of example Figs. 3, 4 and 5 show how the article carrier construction of Figs. 1 and 2 receives three conventional articles. The narrowest of these is an ice cream cone 70 having the usual inverted cone shaped holder 72 with an open top that may be filled with a ball of ice cream 74. For holding this cone the diameter of aperture 38 is selected to receive the side wall 76 of the cone at any suitable portion, generally about a third of the way down from the top. Such cone can therefore be readily deposited in aperture 38 and just as readily removed when it has been carried to the desired location.

Fig. 4 illustrates the article carrier of the invention used to hold a standard cup type ice cream cone. This serving has a cup 82, generally of edible material such as a crispy wafer with a lower portion 86 of inverted frustro-conical shape. The cup 82 is usually filled with two or more balls of ice cream 84.

Cup 82 is arranged to be held on the carrier of Fig. 1 by merely pushing it gently down over the panel 46. The bottom of the cup readily tears out this panel along the outer edge of the connecting webs 48, and the cup then seats itself in the manner shown in Fig. 4.

The largest article, shown in Fig. 5, is a conventional cup 94 of paper or plastic composition, as commonly used for holding coffee, milk or other beverage. This cup also has an inverted generally frustro-conical shape and when pushed down over panel 56 tears this panel loose from its anchorages as shown in Fig. 5. The cup 94 may then seat itself as indicated in Fig. 2.

The position of the cup as shown in Fig. 2, however, is exaggerated somewhat in order to better illustrate the mode of operation of the invention, and in most instances, the cup or other article which is supported in the perforation-defining opening will not usually seat itself below the bottom or lower planar extent of the carrier.

Where the entering portions of the larger articles 94 are small enough, they may first seat themselves into aperture 38 (or 40). However, when they are firmly pushed down to fully seated position, they will tear the panels loose, as required. Cups 92 may also, when first brought down into positive engagement with the panel 56, first tear out panel 46 only. However, here again, continued downward pushing of the cup will cause it to find its proper seat and tear out the entire panel 56.

The respective tear lines 42, 52 are preferably arranged so as to be sufficiently far apart to make a relatively great difference in the said position of cup 92 with the different tear-out panels removed. In this way any incomplete insertion of cup 92 will be readily obvious and the insertion will be completed with a minimum of attention required. In some instances, it may be preferable to exert presure against one connecting web only by a slight tilting of the container to obtain a quick separation of the push-out panel.

A further feature of the present invention resides in the inverted tray-like shape of the serving holder with the flanged finger-grips or notches. Flat sheets of molded pulp material are not convenient for carrying purposes and uninverted tray-like holders have several important disadvantages. These latter type holders carry articles, as illustrated in Figs. 2, 3, 4 and 5, seated in a much lower position, taking up much more room, particularly in the vertical direction, and, in addition, they have side walls extending up close to the said articles, making it difficult to reach in and remove the same.

On the other hand, flange-like marginal walls on an inverted tray without notches will not provide a sufficiently sturdy hand hold. The taper and orientation of such walls make it difficult to hold in the fingers, and even when so held, they are readily deformable in a downward direction so that the tray tends to sag a considerable degree. For the above reasons, marginal flange-like walls, which are normally very useful in stiffening a tray-like molded pulp member held in uninverted position, are highly unsuited for use in unmodified form with inverted type trays.

In many of the prior commercial cellulosic type carriers or trays, a significant disadvantage was encountered due to the lack of suitable grips or handholds for picking up the carrier from off of flat surfaces, particularly when loaded. The flange notches 60 of the present invention avoid the above disadvantages. They make it readily possible for a person to place his thumb over the edge of the tray above a notch with the other fingers slipped into the notch to engage the under surface of the tray and thereby securely hold it. Grasped in this way the tray can be readily manipulated and carried in any desired manner. The holder is a highly efficient and very convenient article for serving all kinds of merchandise such as food items, as for example, in drive-ins, at picnics, etc. The carrier itself is inexpensive so that it is expendible and need be used only once and then discarded.

Although the article seating portions of the carrier of Figs. 1 and 2 are shown as having lines of weakness in the form of interrupted pairs of slots, these lines can be provided in many other ways. The number of spaced slots can be increased to three, four, or even five, or more. Alternatively, the slots themselves can be replaced by small perforations or by the indentations in the wall 36. In addition, the aperture 38 need not be separately provided, but can merely be in the form of a third tear-out panel defined by an additional line of weakness similar to the above.

Figure 6:
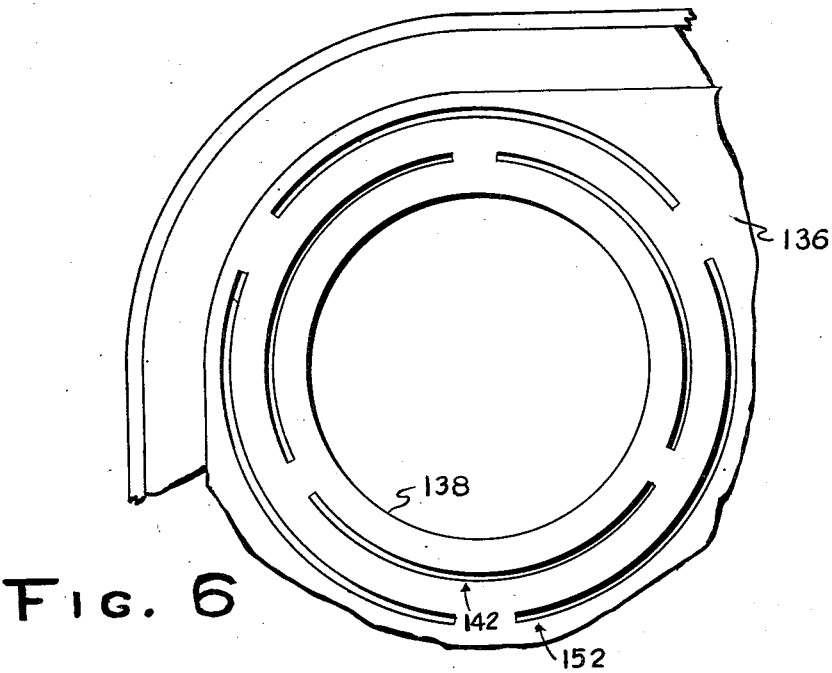
Fig. 6 is a fragmentary plan view of a modified form of article-holding device embodying the present invention.

Fig. 6 shows a modified form of the invention in which a tray-like surface wall 136 has lines of weakness 142, 152 in the form of sets of three spaced slots each. To assure that the inner line 142 weakens wall 136 more than the outer line, the webs between the inner slots are made shorter than the webs between the outer slots. Further, the tear-webs connecting the respective tear-out panels and the wall surface 136 are displaced relative to each other to facilitate the selection of the proper weakness line when inserting an article therein.

Figure 7:
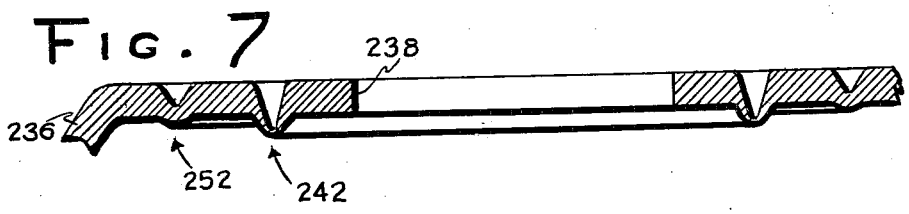
Figs. 7 and 8 are sectional views similar to Fig. 3 of further modified embodiments of the present invention.

Fig. 7 is a sectional view of the article receiving portion of a tray wall 236 in which the lines of weakness are made by indenting or reducing the thickness of wall 236. The central aperture is here shown at 238 surrounded by a first line of weakness 242, and a second line of weakness 252. These lines are defined by considerable reductions in the thickness of wall 236 and are readily provided in the manufacture of the holder, as by suction-molding to the illustrated configuration. The wall thickness reductions may extend as uninterrupted or continuous lines completely around the aperture 238, or alternatively, may have one or more interruptions, depending on the tear resistance desired to be imparted. The tear resistance of line 252 is made greater than that of line 242 as by suitable adjustment of the wall thickness reduction and/or the above interruptions. Although lines 242 and 252 of the construction of Fig. 7 show the reduced wall thickness displaced somewhat below the plane of wall 236, this displacement is not critical to the proper operation of the holder in accordance with the present invention, and it may be eliminated, or even inverted.

Figure 8:
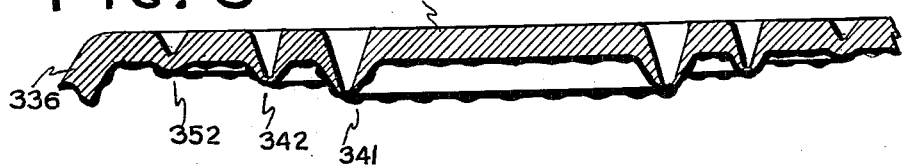

Fig. 8 shows another construction embodying the present invention in which a tray-like wall 336 is provided with three lines of weakness 341, 342 and 352. Line 341 takes the place of the aperture 38 (or 238), and weakens wall 336 more than either of the other lines 342, 352. Line 341 accordingly defines a central tear-out panel 343 which is very loosely held and is readily punched or torn out by any type of article desired to be inserted. In fact, panel 343 may be arranged to practically fall out of its own weight.

The holder of the above figures is preferably made of cellulosic material such as paper (pulp). By way of example, paper fibers may be directly felted or molded into the desired shape by a wet molding operation such as that described in U. S. Patent No. 2,163,585, granted June 27, 1939, and U. S. Patent No. 2,192,937, granted March 12, 1940. When made in this manner it is advantageous to have the forming surface shaped to form the upper surface of the holder. This gives the upper surface of the holder a somewhat neater appearance and at the same time keeps any marginal flashing from being objectionable. The apertures 38, 40 as well as the slots 44, 54 can be formed by inserting suitably shaped obstructions in the forming surface. Where these obstructions have relatively small height, the fibers may tend to form across their tops and will provide the configuration shown for the line of weakness in the construction of Figs. 7 and 8.

Alternatively, the apertures, slots, etc., may be pressed into or punched out of the article after it is otherwise completely formed or completely finished.

Figs. 9 to 12, inclusive, illustrate modified forms of serving trays made according to the present invention and in which the structural features are so arranged as to provide a carrier which is well-balanced when loaded, the perforations for supporting the article containers being positioned at the corners of a rectangular tray-like carrier. In the figures the structural features are identified by numerical subscripts which correspond to the numerical designations used previously with respect to Fig. 1 in identifying the various component parts of the carrier.

Figure 9:
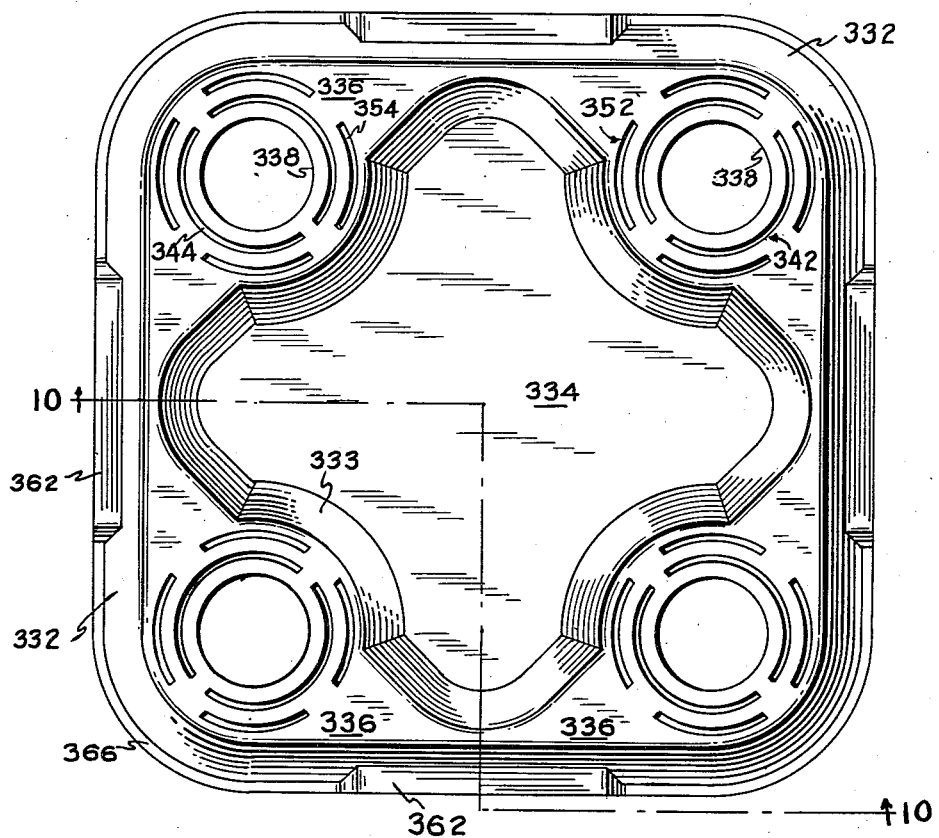
Fig. 9 is a plan view similar to Fig. 1 of a different form of serving tray representative of the invention.
Figure 10:
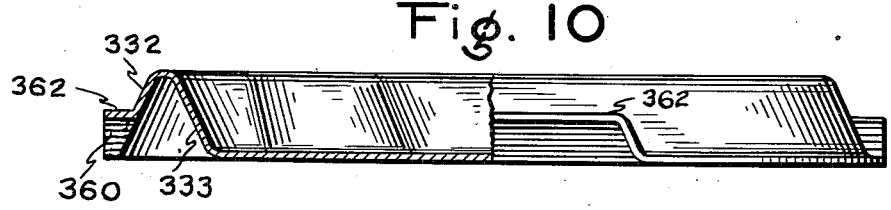
Fig. 10 is a view partly in section along the line 10—10 of the construction of Fig. 9.

As will be seen by an inspection of Figs. 9 and 10, the form of the invention illustrated therein consists of a square-like configurated support or carrier having a centrally located depending support floor 334 or tray area bounded by upwardly and angularly disposed sidewalls 333 which terminate in horizontally flat surface areas 336. The flat surface areas 336 are in turn bounded by a contiguous outer depending side wall 332 formed about the periphery of the carrier and which terminates in a horizontally disposed flanged edge 366 located in the plane of the support floor 334. The area encompassed by the floor 334 provides a recessed tray area upon which may be placed sandwiches, potato chips, and like commodities with little danger of having them slide off of the carrier.

Within each of the flat surface areas 336 is disposed an article or container receptacle defined by a central perforation 338 and concentric lines of weakness 342 and 352, respectively, in like manner to that previously described with respect to Fig. 1. A plurality of finger grips or handhold flanges 362 are disposed in the central portions of the side wall 332 on each side of the tray for a purpose identical to that described previously.

It will be particularly noted that the supporting floor 334 has a generally rectangular shape which is oriented with respect to side walls 332 so that the corners of said support floor lie at the midpoints of the respective side walls directly opposite the center of the hand grip flanges 362. This particular construction results in a substantial increase in the inherent load carrying ability of the tray inasmuch as it provides for gripping of the tray at diametrically opposite points wherein the major portion of the load will be concentrated. It will further be noted that the container receptacle areas are disposed at each corner of the carrier, and in each case, are substantially reinforced by virtue of the curved contour of the angularly extending side walls 332 and 333 in that region.

The positioning of the container receptacle in the corners of the tray permits the carrying of four drinks, ice cream cones, or like commodities in such manner that the weight of the same is uniformly distributed over the tray, whereby any induced torsion force due to an unusual weight or load may be easily offset by manual pressure exerted at the finger grips 362.

Figure 11:
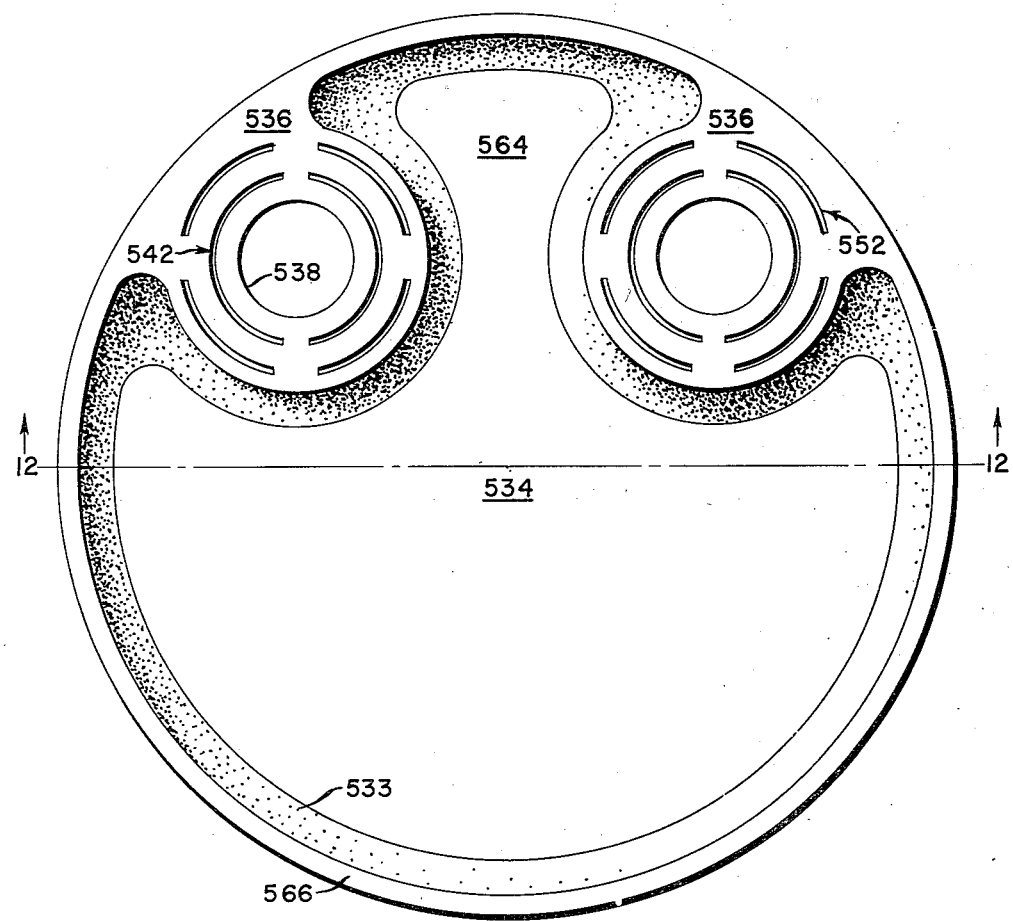
Fig. 11 is a plan view and Fig. 12 a sectional view, respectively, taken along the line 12—12 of Fig. 11, of a still further embodiment of the invention.
Figure 12:
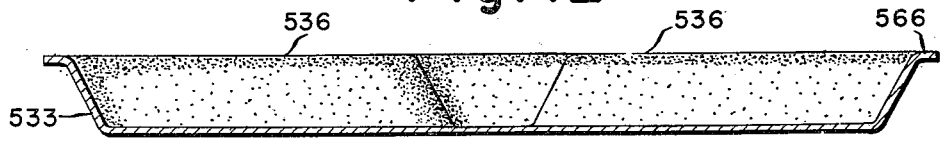

Figs. 11 and 12 illustrate a still further modified form of the invention and one which is particularly adapted for single serving application, as for example at picnics, outdoor exhibitions, and home parties. This modified form of the invention comprises a tray-like carrier having a plate-like circular configuration defined by an angularly upwardly extending contiguous side wall 533 and an integral upper horizontally extending flange member 566. Approximately one-half of the tray-like carrier is formed to have a construction similar to that of conventional paper plates and includes a lower tray or supporting floor 534. The other half of the carrier, however, is formed with upper horizontally extending plateau-like support walls 536 which extend inwardly from flange 566 towards the center of the carrier where they merge with side wall 533. Walls 536 provide frustro-conical islands in which are formed the article or container receptacle structures 538, 542 and 552 in a manner similar to that previously described.

This form of the invention is particularly adapted for one-handed support which may be provided through the simple expedient of inserting the hand beneath the tray floor surface 534 between the receptacle islands 536 so that the curved portion 564 of the supporting floor 534 rests against the palm of the hand. The index finger and the little finger of the hand will thus become automatically disposed in frictional contact with the adjacent bulged portions of the contiguous side walls 533 at the inside of the container receptacle areas 536. This construction of the carrier thus makes it possible to more easily balance a supported load with the relatively heavier foodstuffs positioned in the container receptacles defined by perforations 538, 542 and 554, and disposed on respective sides of the hand to thereby eliminate the unbalanced torsional forces. If necessary, the thumb may be inserted over the side walls 533 in the region of the palm engaging floor area 564 to provide a positive and firm grip without the necessity for requiring special handholds in the carrier construction.

The modification of the invention illustrated in Fig. 13 is similar to that illustrated in Figs. 11 and 12 with the exception that the plateau-like islands 636 are disposed along a diameter and are on opposite quarters of the circular carrier. This form of the invention effects a more convenient division of tray-like floor 634 into two areas on opposite sides of the diameter connecting the supports 636, 636. This divides the articles to be placed on floor 634 where they are intended for two different people, for example. It is also particularly suitable for a single handed support which may be provided by permitting the tray to rest upon the palm of the hand with the centrally located narrow portion of the tray floor 634 disposed in the center of the palm. It will thus be apparent that the receptacle areas 636, when loaded with a conventional article or container will again be disposed on opposite sides of the supporting hand to provide a balanced condition rendering the transportation of the supported foodstuffs relatively simple. Alternatively, the tray may be placed upon the hand so that the fingertips engage the side wall 633 beneath one receptacle area and the thumb grips it beneath the other receptacle area.

A still further modified form of the invention is illustrated in Figs. 14 and 15. This construction comprises a generally rectangular or box-like carrier formed by an upwardly extending angularly directed contiguous side wall 732 having a centrally located depending support floor 734 bounded by angular side walls 733 and which is oriented to have a greater extent in a direction which is transverse to the larger dimension of the tray. This provides more room for the floor 734, and still more room can be provided by extending the ends of the floor as by forming the carrier with small extensions at the ends of its smaller axis.

At the respective sides of the floor 734 are provided raised plateau-like receptacle support areas 736, each of which contains an article or container support defined by perforations 738. Each container support is formed as an opening defined by radially inwardly directed flexible finger grip members, the outline of which is provided by the spaced finger members 788 which are provided in place of the perforations 38 and lines of weakness 42 and 52 in the other constructions to hold articles of varying widths.

In this construction there is no necessity for punching out or separating any panel sections from the carrier, since the tab-like extensions 788 constitute integral portions of the tray walls 736 and are sufficiently strong to adjust themselves to any diameter of the finger and can support relatively small, light articles, such as ice cream cones. When it is desired, however, to carry heavier articles having a larger circumference than the conventional ice cream cone, the present construction will easily accommodate the same through the expedient of inserting such article in the openings 738 and pressing down against tabs 788 to bend the same upon themselves and provide a larger supporting seat. Due to the integrally matted nature of the cellulosic fibers used in the construction of the tray, each of the tab or finger members 788 retains an inherent degree of resiliency which permits the same to apply a light, frictional grip against the side wall of the encompassed article and to support the same firmly against tilting due to shocks, jars, and the like. It will be apparent that tabs 788 provide unlimited number of positions from the inner hole to the maximum diameter of the fingers as areas which are automatically and inherently shaped to fit the supported article.

The article supporting areas may be formed during the initial formation of the carrier as by providing suitable die surfaces on the forming dies used in conventional suction molding operations. Alternatively, the receptacle perforations may be placed in the carrier subsequent to the forming operation as by a stamping process.

Figure 16:
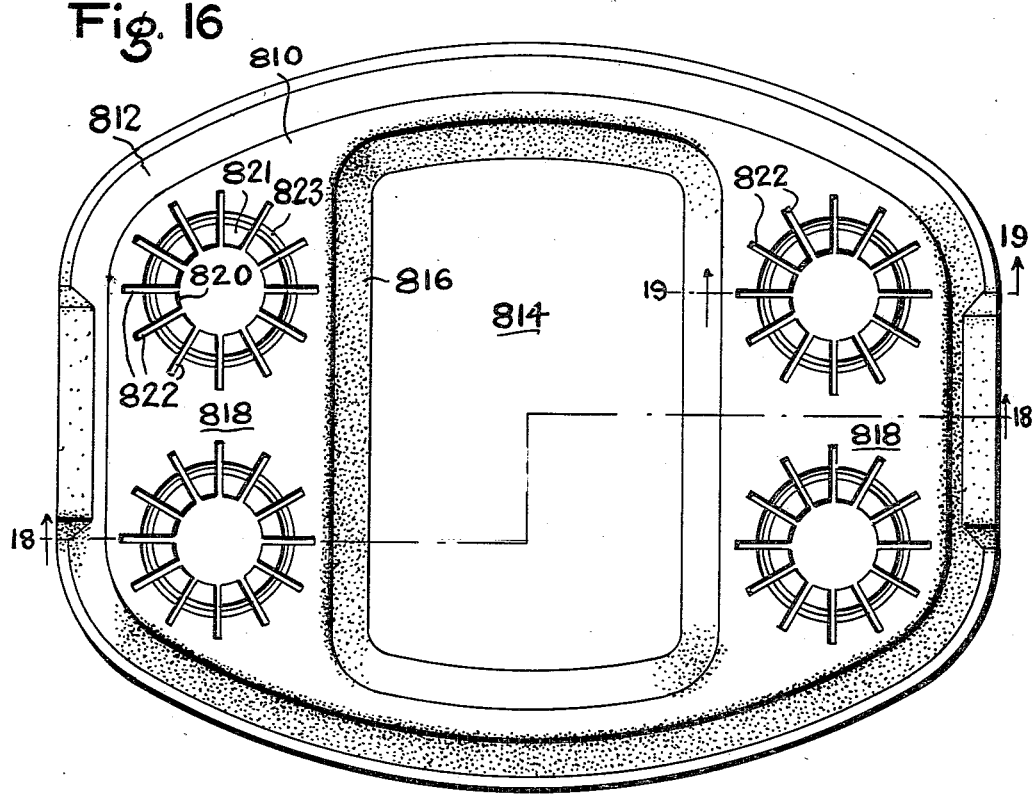
Fig. 16 is a plan view and Fig. 17 a side view of a further modified and preferred serving tray construction.
Figure 17:
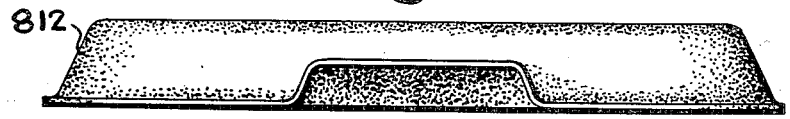
Figure 18:
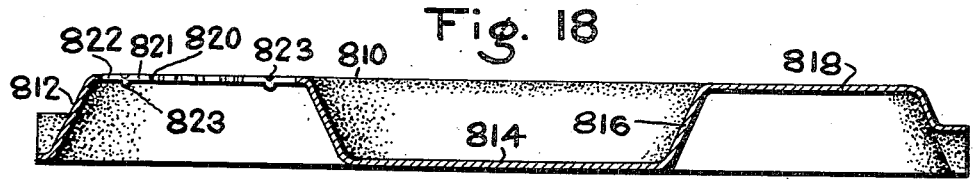
Fig. 18 is a sectional view taken along the line 18—18 of the construction of Fig. 16.

Figs. 16, 17 and 18 show a serving tray made of molded fibers according to a further and preferred modification of the invention. This tray is generally elliptical in outline with straight ends, and has a body portion 810 surrounded by an angularly-disposed depending marginal wall 812 extending around the entire periphery of the tray.

Within the body portion is formed a depressed cavity 814, generally rectangular in outline, bounded by angularly disposed depending wall flanges 816. The cavity 814 does not use all the available space on the body 810 and leaves a plateau-like area 818 at either end of the tray. Areas 818 contain a plurality of apertures or holes 820. The periphery of each hole 820 is extended outwardly by a plurality of radial slots 822.

Across each tongue 821, formed by two adjacent radial slots 822, is provided at a convenient distance from the central portion of aperture 820, a line of weakness 823. At the outer end of the slots 822 a second line of weakness (824 in Fig. 20) may be provided if desired.

The cavity 814 may be used as a receptacle for articles of any nature but particularly for items of food such as hamburgers, frankfurters, sandwiches, candy or the like.

Holes 820 and slots 822 are provided to receive articles of a varying nature and size, such as ice cream cones, drinking cups and the like.

Figure 19:
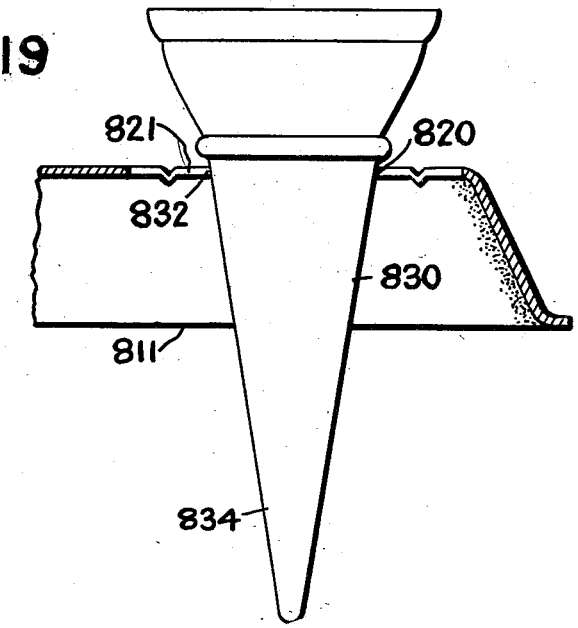
Fig. 19 is a fragmentary sectional view of the tray of Fig. 16 taken along the line 19—19 with an ice cream cone shown held in place.

In Fig. 19 an ice cream cone 830 is shown in place in hole 820 of the carrier of Fig. 16, the cone coming to rest on the ends of tongues 821 at 832, the end 834 of the cone extending below the bottom 811 of the tray.

Figure 20:
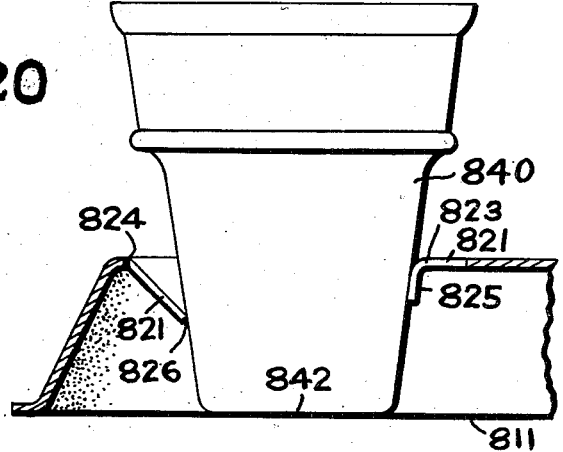
Figs. 20, 21 and 22 are views similar to Fig. 19 showing different articles held in place as well as a step in the removal of one of them.

In Fig. 20 a larger cone 840 is shown in place. Being too large to fit in the hole provided to receive small articles such as cone 830, article 840 bends the tongues 821 downwardly in the manner shown at 825 on the right. This takes place with or without the respective lines of weakness at 823 and 824. An article such as this may be pushed through the hole only until the flat bottom 842 is flush with the bottom 811 of the tray and the natural resilience of the fibers in the tongues 821 will retain the article in this position when the tray is lifted.

Tongues without such lines of weakness, and especially if roughened on their upper surfaces in the usual manner of production of the carrier 540 tend to become locked in place in frictional contact with the article when an attempt is made to remove the article from the carrier. This is shown in Fig. 20. In this position the tongues 821 are braced very strongly and generally punch holes in the brittle, edible material of cone 840 when said cone is withdrawn from the hole.

Figure 21:
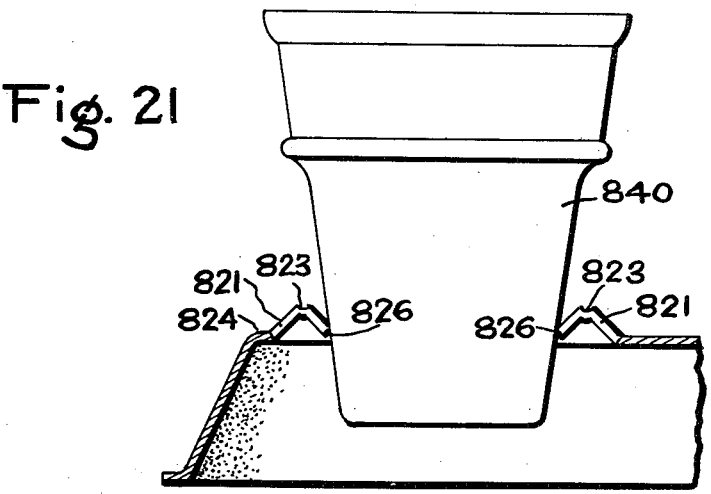

In the instant invention the tongues 821 as shown at 825 in Fig. 20, will readily hinge back out of the way when the article is withdrawn. The tongues in locking position as illustrated at 826 in Fig. 20 will also fold up out of the way when the article is removed. This is illustrated in Fig. 21 and takes place more readily with two lines of weakness 823, 824, although only the line 823 is really necessary.

The folding or collapsing action of the fingers is facilitated by limiting each finger member to be less than 30° in width. Thus, the provision of narrow, closely spaced finger members permits the same to support an article with a firm seating action without interfering with the ready withdrawal of the article from its seated position.

Figure 22:
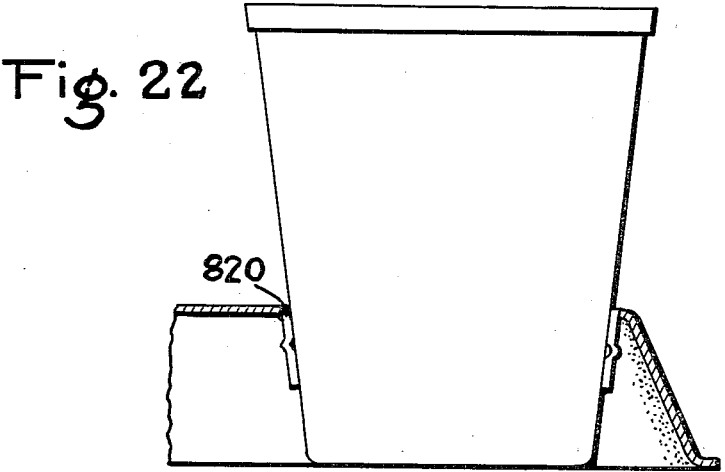

Fig. 22 shows the placement of a maximum size article, such as a large drinking cup, in opening 820. Articles of this nature are generally smooth and hard on the outer surface and do not become caught in place as described above, but if so caught, are strong enough to tear the tongues 821 without incurring injury to themselves.

According to a further aspect of the present invention, the tear-out panels 46, 56 (see Figs. 2, 4 and 5) may have their levels offset so that the seating of an article will more positively guide it far within the inner panel or into the inner opening 38, depending upon the size of the article. For this purpose the inner panel 46 can be depressed below or raised above the outer panel 56.

One of the features which is generic to all of the above disclosed forms of the invention is the fact that the formation of the carriers from a cellulosic fiber, and preferably, by suction molding from an aqueous slurry of pulp fibers, permits the incorporation of desired additional ingredients, as for example, binders or waterproofing agents, into the fiber matrix without requiring any special or extra processes or precautionary measures other than the simple expedient of including the desired additive in the initial material.

Still another feature of the carrier of the present invention is that it has unexcelled, desirable stacking characteristics for storing the carriers in a compact condition. It will be noted that there are no vertical walls on the carriers so that they nest together readily for storage and/or transportation in very little more space than is necessary to accommodate only the combined wall thicknesses of the stacked units.

It will further be apparent that the present invention eliminates any necessity for assembling finished article carriers of the prior art for example where the article holding configuration is provided in a folding construction stamped from a fiber-board blank. Such assembling requires special preparatory manipulation and requires a considerable space for storage of the assembled carriers, if any appreciable quantity is to be assembled in advance. Furthermore, the folding type carriers do not nest so that when a quantity is piled upon a column they are easily knocked over by slight forces such as air currents from overhead fans and the like. This is in direct contrast to a nested stack of the present invention which takes up comparatively little height and is not readily blown over.

It is only necessary that the carriers of the present invention be removed one-by-one from the stacked array as they are needed and without requiring any assembling operations whatsoever.

A still further advantage which is inherent in the interlocking nature of the tray construction of the present invention resides in the manner in which assembled or stacked units of the same may be handled while being transported during and subsequent to manufacture of the same. With the present nestable construction, the molded pulp articles, after being partially or completely dried to a self-contained integral mass may be arranged into vertically tiered, stacked assemblies containing as many as 200 to 300 trays and such assemblies transported as a single unit to a further station for a subsequent process such as finish pressing and/or packaging. It will be apparent that this in turn reduces the cost of manufacture in eliminating many manual or intermediate handling steps. Further, the nested interlocking assemblies may be packaged as such and transported to the ultimate consumer in a single carton or wrapping and from which the individual trays may be removed as needed without additional manipulative operation other than the simple act of lifting each tray from its nested condition. Another advantage is the interchangeable character of the structural features of the different carriers. By way of example, any type of article-holding formation such as the tearable panel construction of Fig. 1, the plain holding fingers of Fig. 14, and the weakened hingeable fingers of Figs. 16 and 20 can be used in article carriers having any of the above described configurations. In addition, different kinds of article holding formations can be used on the same carrier if desired.

As many apparently widely different embodiments of this invention may be made without departing from the spirit and scope hereof, it is to be understood that the invention is not limited to the specific embodiments hereof except as defined in the appended claims.

What is claimed is:

1. An article carrier having a molded pulp, tray-like wall, said wall being provided with at least one article-holding means, said article-holding means comprising a plurality of concentric, continuous annular lines of weakness to permit said article-holding means to firmly hold articles of varying sizes and shapes in various positions of adjustment, said lines of weakness increasing in strength a they are positioned radially further away from the concentric center.

2. The article carrier of claim 1 wherein said lines of weakness each comprise a groove defined by a bottom wall of reduced thickness, and wherein said bottom walls increase in thickness with the increased distance of said lines of weakness from the concentric center.

3. The article carrier of claim 1 wherein the radially innermost line of weakness defines a central opening and wherein radial slots extend from said opening through the outermost line of weakness.

4. A molded pulp tray comprising a generally straight, horizontal wall, an upstanding peripheral wall defining said horizontal wall, a depressed, generally flat, area in said horizontal wall, and at least one article holding means on said horizontal wall adjacent said depressed area, said article holding means comprising a plurality of concentric, continuous annular lines of weakness to permit said article-holding means to firmly hold articles of varying sizes and shapes in various positions of adjustment, said lines of weakness increasing in strength as they are positioned radially further away from the concentric center.

References Cited in the file of this patent

UNITED STATES PATENTS

| | | |
|---|---|---|
| D. 122,589 | Bastress | Sept. 17, 1940 |
| D. 170,237 | Randall | Aug. 18, 1953 |
| 1,673,869 | Fulton et al. | June 19, 1928 |
| 1,702,199 | Cunningham | Feb. 12, 1929 |
| 1,754,713 | Green | Apr. 15, 1930 |
| 2,314,935 | Gutterman | Mar. 30, 1943 |
| 2,321,519 | Rubinoff | June 8, 1943 |
| 2,466,636 | Bruckner et al. | Apr. 5, 1949 |
| 2,556,844 | Istwan | June 12, 1951 |
| 2,579,490 | Gordon | Dec. 25, 1951 |
| 2,670,124 | Buchmiller | Feb. 23, 1954 |